United States Patent [19]

Ito et al.

[11] Patent Number: 4,898,317
[45] Date of Patent: Feb. 6, 1990

[54] WELDING WIRE STRAIGHTENING DEVICE AND WELDING TORCH

[75] Inventors: Shigeo Ito, Nagoya; Toshihiko Imaeda, Niwa; Ryuhei Takagi, Owariasahi; Ryutaro Sato, Obu, all of Japan

[73] Assignee: Daido Tokushuko Kabushiki Kaisha, Nagoya, Japan

[21] Appl. No.: 373,608

[22] Filed: Jun. 26, 1989

Related U.S. Application Data

[63] Continuation of Ser. No. 309,983, Feb. 9, 1989, abandoned, which is a continuation of Ser. No. 940,950, Dec. 12, 1986, abandoned.

[30] Foreign Application Priority Data

Jul. 14, 1986 [JP] Japan .............................. 61-107860[U]

[51] Int. Cl.⁴ .............................. B23K 9/28; B23K 9/12
[52] U.S. Cl. ........................................ 228/41; 228/52; 219/137.8
[58] Field of Search ................ 228/41, 52; 219/137.31, 219/137.8

[56] References Cited

U.S. PATENT DOCUMENTS

| 2,302,781 | 11/1942 | La Force | 219/137.8 |
| 3,582,599 | 6/1971 | Yohn | 219/137.8 |
| 3,748,435 | 7/1973 | Reynolds | 219/137.8 |
| 4,136,273 | 1/1979 | Eujita et al. | 219/137.8 |
| 4,373,657 | 2/1983 | Fillon | 228/41 |

FOREIGN PATENT DOCUMENTS

| 435365 | 10/1926 | Fed. Rep. of Germany | 228/41 |
| 144220 | 10/1980 | German Democratic Rep. | 219/137.8 |
| 212204 | 8/1984 | German Democratic Rep. | 219/137.8 |
| 623680 | 9/1978 | U.S.S.R. | 219/137.8 |
| 1569358 | 6/1980 | United Kingdom | 219/137.8 |

Primary Examiner—Nicholas P. Godici
Assistant Examiner—Samuel M. Heinrich
Attorney, Agent, or Firm—Koda & Androlia

[57] ABSTRACT

A device for straightening a welding wire which includes a box-shaped frame of a generally rectangular configuration through which a welding wire is fed, and a plurality of pairs of wire straightening rollers mounted on the frame in longitudinally spaced-apart aligned relation along the path of wire feed, the pairs of rollers each having roller surfaces in transversely spaced-apart opposed relation, and the adjacent pair of rollers being located at a desired phase angle relative to each other.

5 Claims, 15 Drawing Sheets

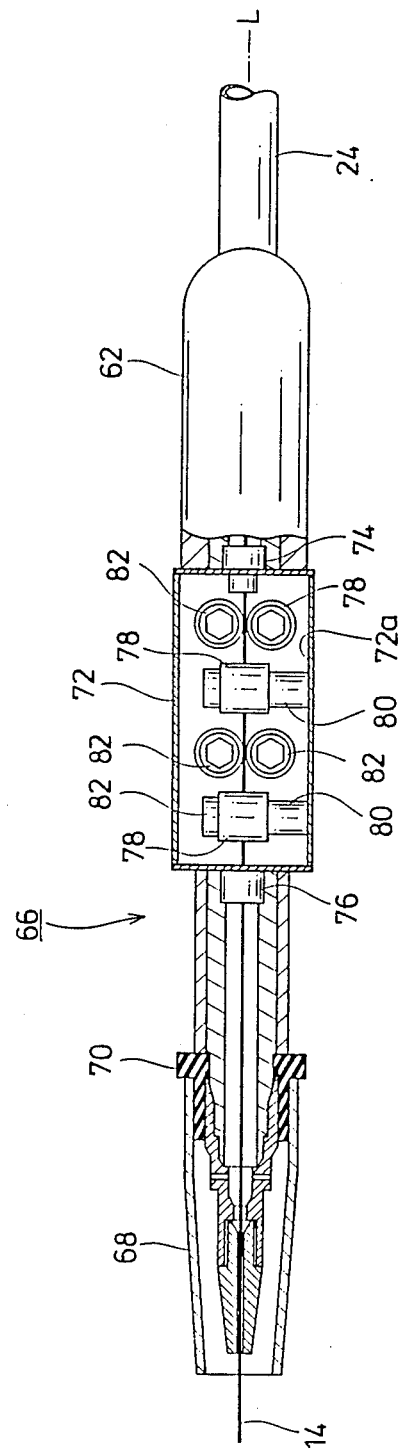

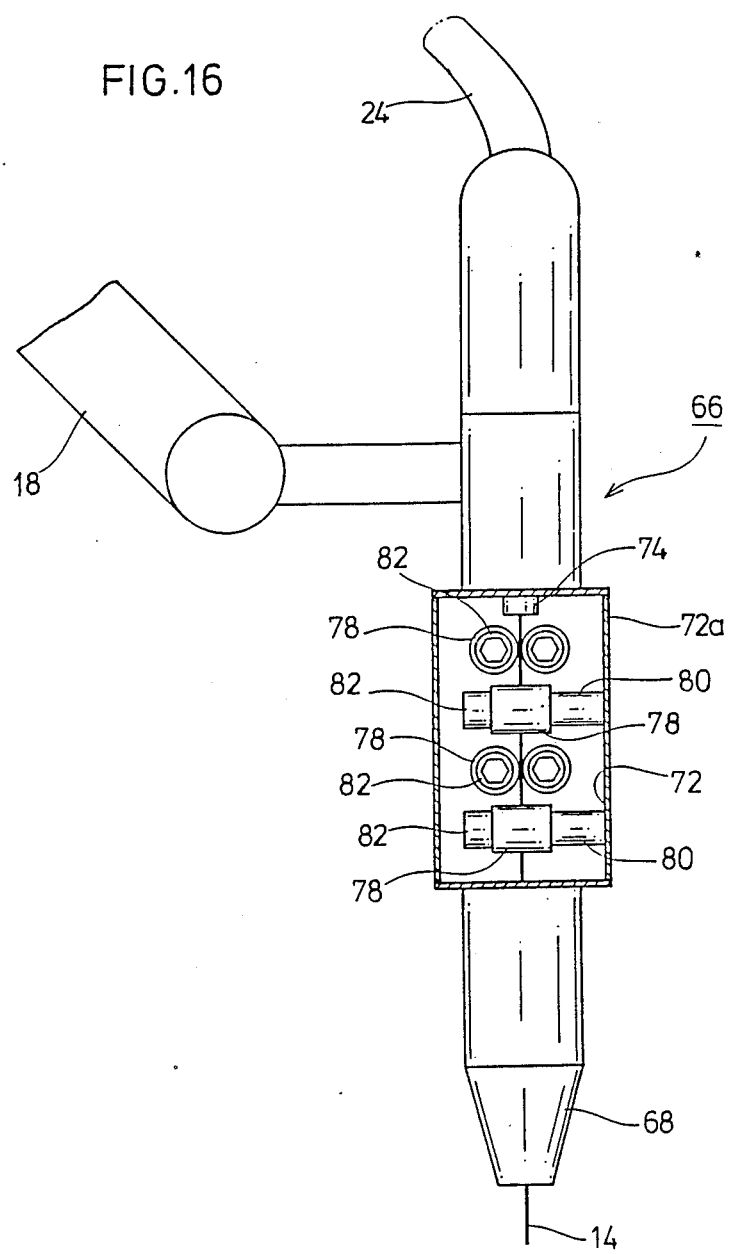

WELDING WIRE STRAIGHTENING DEVICE AND WELDING TORCH

This is a continuation of application Ser. No. 309,983 filed Feb. 9, 1989 now abandoned, which is a continuation of application Ser. No. 940,950 filed Dec. 12, 1986 now abandoned.

BACKGROUND OF THE INVENTION

1. Field of the Invention

The present invention relates to a wire straightening device which is capable of reliably accomplishing the wire straightening task while being lightweight and compact, and which may be mounted on an arm end of an arc welding robot within the restriction of load weight. The present invention is also concerned with a welding torch incorporating such a wire straightening device.

2. Description of the Prior Art

In the art of carbon dioxide ($CO_2$) welding, Metal Argon Gas (MAG) welding and/or Metal Inert Gas (MIG) welding, it has been an established technique to continuously feed welding wire to a torch so as to perform the welding operation intended. Welding wires are of two types according to the amount in which they are used, namely those wound and stored in a pail pack and those wound on a reel. Of these two types, the pail pack type wire is wound and stored in a predetermined manner in a pail container comprising an inner and an outer cylinder, and during the welding operation, the wire is continuously drawn from the container to the torch.

In general, welding wires are conditioned to have high tensile strength. However, the wires become distorted during the manufacturing process, particularly when they are wound into a pail container in a coiled configuration. The wires also become spirally twisted when they are drawn from the pail container. As shown in FIG. 1, when such twist remains on a welding wire 14, the tip of the wire 14 extending from a nozzle 12 of a welding torch 10 swings irregularly as the wire is drawn from the nozzle 12, resulting in a zigzag welding bead and/or out-of-centricity on a work to be welded. In manual welding, such swing of a wire tip can be more or less eliminated by the operator monitoring the welding line. However, this requires substantial skill and experience. With automatic welding devices such as arc welding robots and self-travelling welders, the swing of wire at a nozzle tip can lead to fatal defects.

Various wire straightening devices have been devised heretofore to straighten distortion and/or twist of a welding wire drawn from a pail container and eliminate swing of the wire at the nozzle tip. While the prior art devices have generally been successful in straightening welding wires, they are rugged in construction and bulky, and significantly heavy.

When the above-noted $CO_2$ welding, MAG welding and/or MIG welding are carried out for a large amount of work, for example, in an automobile assembly line or under welding conditions where man power is impractical, computerized, multi-articulated welding robots are generally used. Specifically, as shown in FIG. 2, the arc welding robot includes a robot body 16 with an arm 18 turnably and tiltably secured thereto, and the forward end of the arm 18 has a welding torch 10 serving as a wrist. Thus, wire is drawn from a pail pack 22 as it is straightened by a known straightening device 24 provided on the base portion of the arm 18 and a cooperating wire feeding motor 26 provided downstream of the straightening device 24, to be fed to the forward end of the torch 10 through a flexible conduit 28. In this arrangement, the welding torch 10, which serves as a wrist, is capable of performing three-axes motion including, for example, horizontal turning, vertical turning and vertical swing. The motion of the welding torch 10 relative to the work to be welded is controlled in accordance with the programmed procedures inputted in a control unit (not shown). It will be noted that the hose for supplying shield gas and cable for supplying positive welding current are not shown in FIG. 2.

When the welding operation is performed using the multi-articulated robot as described above, the welding torch serving as a wrist is capable of performing three-axes motion for example, and hence the torch end provides a composite motion derived from each of the three-axes motion. Thus, in the construction shown in FIG. 2, when the welding torch 10 effects the complex, composite motion, the welding wire 14 of which the twist has been removed by the straightening device 24 will again be given a twist and other distortion in the path from the device 24 through the conduit 28 to the torch 10. For this reason, the tip of wire 14 extending from the torch 10 tends to swing irregularly, as mentioned hereinbefore. Specifically, the straightening device 24 mounted on a base portion of the arm 18 does not work on the twist imparted to the wire between the straightening device 24 and the welding torch 10. In the welding robot, therefore, the straightening device should preferably be located immediately before the torch 10, thereby straightening the twist and distortion produced in the path up to the torch.

It will be important to note that in the multi-articulated robot, load weight which may be supported by the wrist is limited. If the load weight exceeds the limit, accurate and smooth motion may not be attained. Therefore, from an idealistic viewpoint, the straightening device should be located on the torch itself which is mounted on the forward end of the arm, but this has been practically difficult because of the restriction of load weight as noted above. In addition, the previously known wire straightening devices do not attain perfect performance in that they sometimes fail to straighten welding wires perfectly.

SUMMARY OF THE INVENTION

It is, accordingly, an object of the present invention to improve the efficiency of straightening twist of welding wire in a wire straightening device.

It is another object of the present invention to provide a wire straightening device which is lightweight and compact and yet which may be mounted on a torch serving as a wrist of an arc welding robot within the restriction of load weight so as to straighten the twist and the like distortion developed by the various movements of the torch, thereby accomplishing accurate welding operation without degrading the smooth motion of the arm.

It is a further object of the present invention to provide a one-piece construction of a wire straightening device and a torch when such a wire straightening device is mounted on the arm of an arc welding robot.

In accordance with the present invention, there is provided a device for straightening a welding wire which includes a box-shaped frame of a generally rectangular configuration through which a welding wire is fed, and a plurality of pairs of wire straightening rollers mounted on the frame in longitudinally spaced-apart aligned relation along the path of wire feed, the pair of rollers each having roller surfaces in transversely spaced-apart opposed relation, and the adjacent pair of rollers being located at a desired phase angle relative to each other.

Also in accordance with the present invention, there is provided a welding torch which comprises a plurality of wire straightening rollers integrally mounted within the torch and adapted to pass a welding wire therebetween for straightening the distortion and twist of the welding wire.

BRIEF EXPLANATION OF THE DRAWINGS

The present invention will become more fully apparent from the claims and description as it proceeds in connection with the drawings.

FIG. 15 is a vertical sectional view of the welding torch of FIG. 14; and

FIG. 16 is a partially cutaway side view illustrating the welding torch mounted on an arm of a welding robot.

DESCRIPTION OF THE PREFERRED EMBODIMENTS

Figure 3:
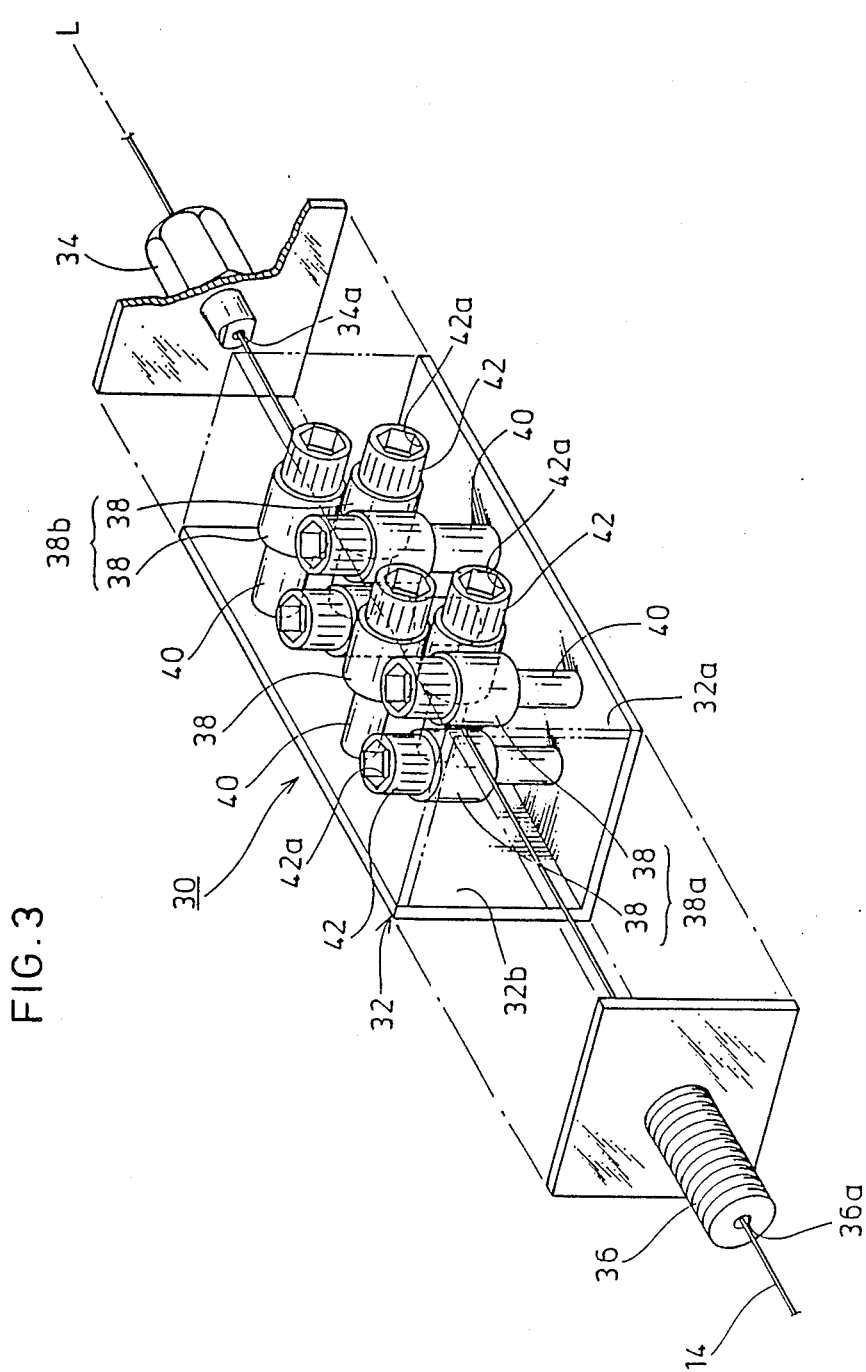
FIG. 3 is a schematic perspective view of a first embodiment of the invention.
Figure 4:
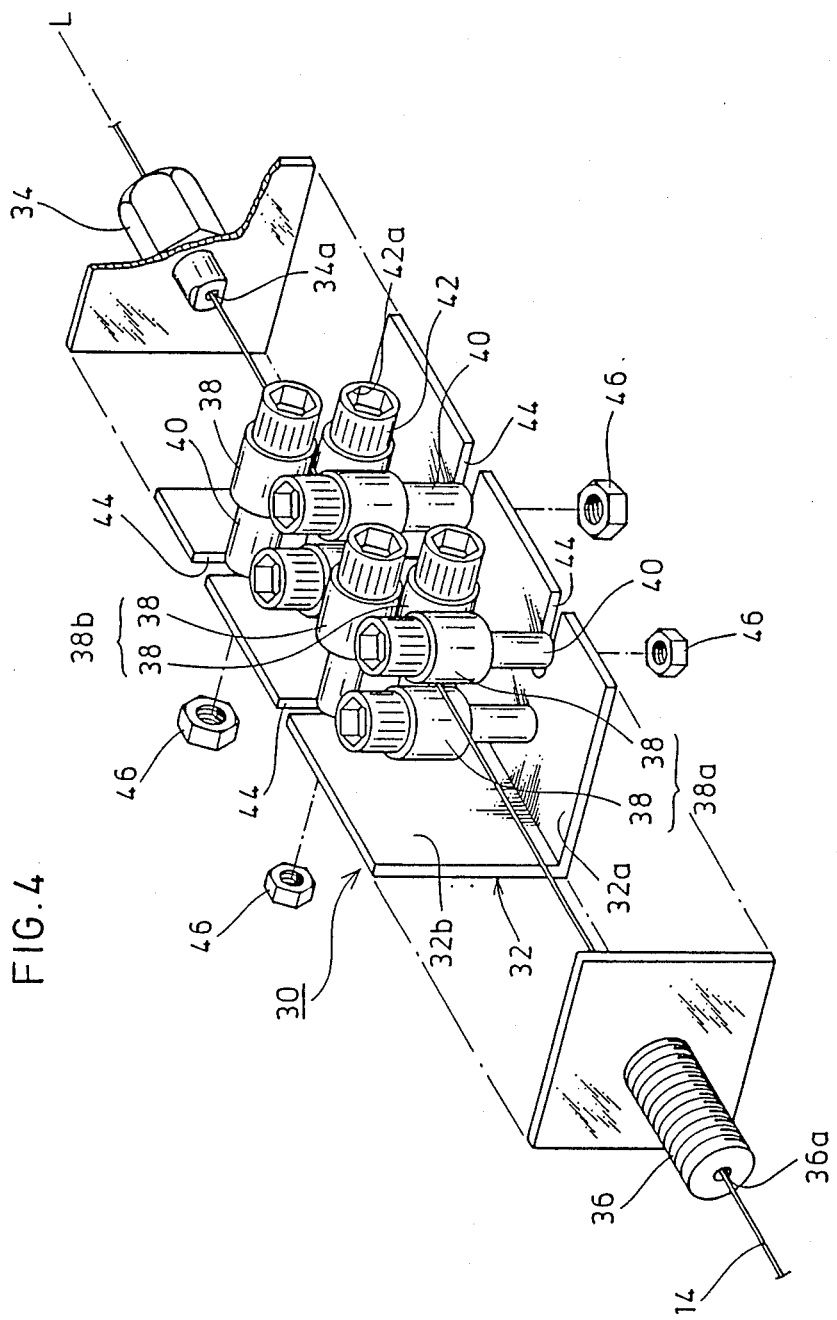
FIG. 4 is a schematic perspective view showing a modification according to the invention to the embodiment of FIG. 3.
Figure 5:
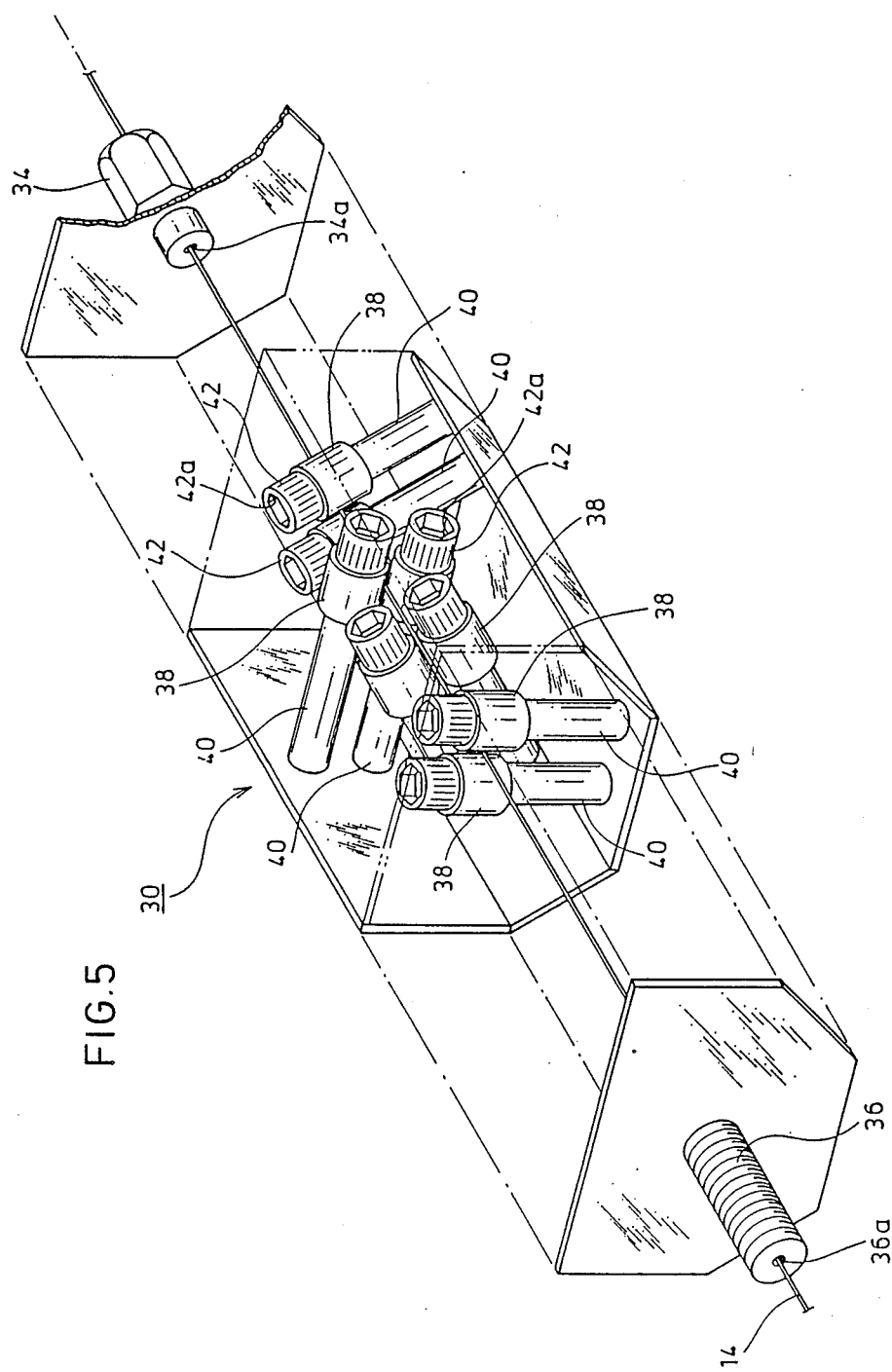
FIG. 5 is a schematic perspective view showing a modified arrangement of wire straightening rollers of FIG. 3.

The device for straightening a welding wire according to the present invention will be described hereinafter with reference to the accompanying drawings. FIGS. 3 to 5 show schematic perspective views of a wire straightening device 30 according to a first embodiment of the invention. The wire straightening device 30 includes a box-shaped frame 32 having, for example, a generally rectangular configuration in section. The frame 32 includes an inlet sleeve 34 and an outlet sleeve 36 connected to the longitudinal opposite ends thereof, respectively. The sleeves 34 and 36 have wire insertion holes 34a and 36a formed in opposed relation to and axial alignment with each other. Within the box-shaped frame 32, a series of rotatable rollers 38 for straightening a welding wire are arranged in juxtaposed relation and at a predetermined phase angle along a path L of wire feed. Specifically, as shown in FIG. 3, two support pins 40 are vertically mounted on the bottom surface 32a of the frame 32 and are transversely spaced at a predetermined interval in a direction perpendicular to the wire feed path L. Two pairs of the vertical support pins 40 are provided and are longitudinally spaced at a predetermined interval in a direction along the wire feed path L passing through the wire insertion holes 34a and 36a, respectively, of the sleeves 34 and 36. Each wire straightening roller 38 is rotatably carried on each support pin 40 in each pair of support pins.

The wire straightening rollers 38 may be small bearings commercially available, the outer races serving as rollers. In the embodiment illustrated, the inner race (not shown) of each small bearing is fitted at a predetermined height over the medial portion of the pin 40, and each bearing is removably fastened by a nut 42 having a top hole for a hexagon wrench. Alternatively, the rollers 38 may be bushings in place of the bearings.

Similarly, support pins 40 are provided in pairs and horizontally mounted on the vertical side wall 32b of the frame 32 adjacent the vertical roller pairs 38 disposed along the wire feed path L. Here again, each support pin 40 has each roller 38 rotatably carried thereon. In the present instance, another pair of opposed rollers 38 which is mounted horizontally on the vertical side wall 32b, is provided along the wire feed path L and with the vertical pair of rollers 38 intervening between the two pairs of horizontal rollers 38. Thus, the roller group includes two pairs of vertical rollers 38a and two pairs of horizontal rollers 38b.

In the embodiment of FIG. 3, the vertically-disposed roller pairs 38a and the adjacent horizontally-disposed roller pair 38b are held at a phase angle of 90° relative to each other, and the distance between the paired rollers are set to a measure substantially equal to the diameter of a welding wire to be straightened. In addition, the adjacent roller pairs are arranged on a straight line along the wire feed path L extending between the wire insertion holes 34a and 34b. In other words, the roller pairs are spaced and are arranged on a straight line such that through the wire insertion hole 34a, the other wire insertion hole 36b is visible along wire feed path L.

The distance between the paired rollers 38 may be fixedly constant; however, in that case, the diameter of the welding wire 14 to be straightened will necessarily be fixed, making it difficult for the device 30 to be used for a wire of a different diameter. In order to cope with this, as shown in FIG. 4 for example, one of the support pins 40 supporting the pair of rollers 38 may be designed to move relative to the frame 32 so that the distance between the opposed rollers 38 may be adjusted. To this end, slits 44 may be formed in the horizontal bottom surface 32a of the frame 32. In each of the slits 44, an integral bolt formed on the base portion of the support pin 40 is inserted, and the support pin 40 is adjustably secured by a nut 46 from the back of the bottom surface 32b.

FIG. 5 shows a modification according to the invention. As shown therein, the pair of opposed rollers and the adjacent pair of opposed rollers are arranged at a phase angle of 45°. In this instance also, each pair of rollers and each adjacent pair of rollers are arranged in equally spaced-apart phase relationship along the wire feed path L.

Figure 6:
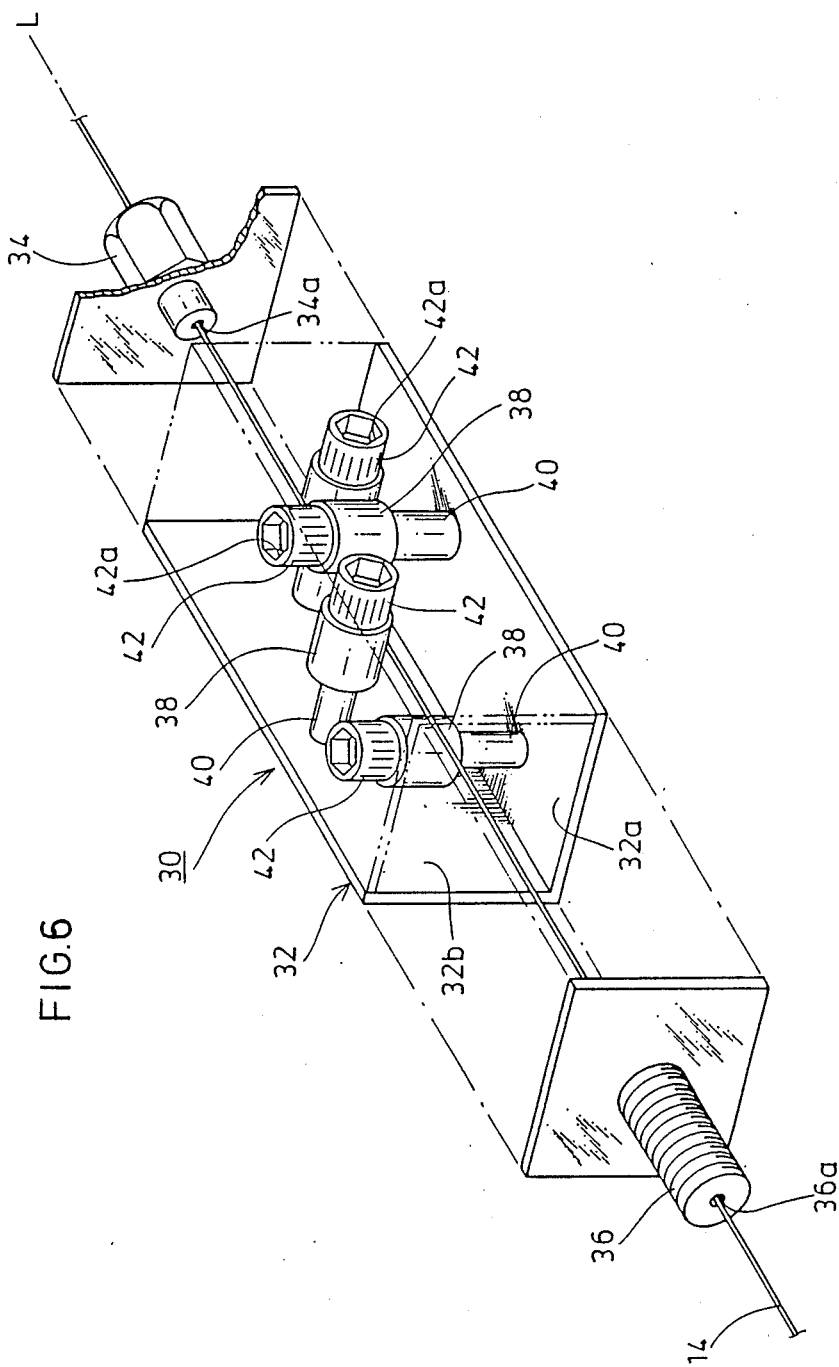
FIG. 6 is a schematic perspective view showing another modified arrangement of wire straightening rollers of FIG. 3.

FIG. 6 shows another modification according to the invention. In this modification, the straightening rollers 38 are arranged on a straight line along the wire feed path L and the adjacent rollers are held, for example, at a phase angle of 90°. However, unlike the embodiments of FIGS. 3 to 5, the rollers are not pairs and do not have the opposite one. Although the embodiments of FIGS. 3 and 6 utilize cylindrical rollers as straightening rollers, it will be noted that other types of rollers could be utilized so long as their roller surfaces are positioned at a required phase angle relative to each other. For example, the rollers could be a tapered roller having a required angle of inclination.

Figure 7:
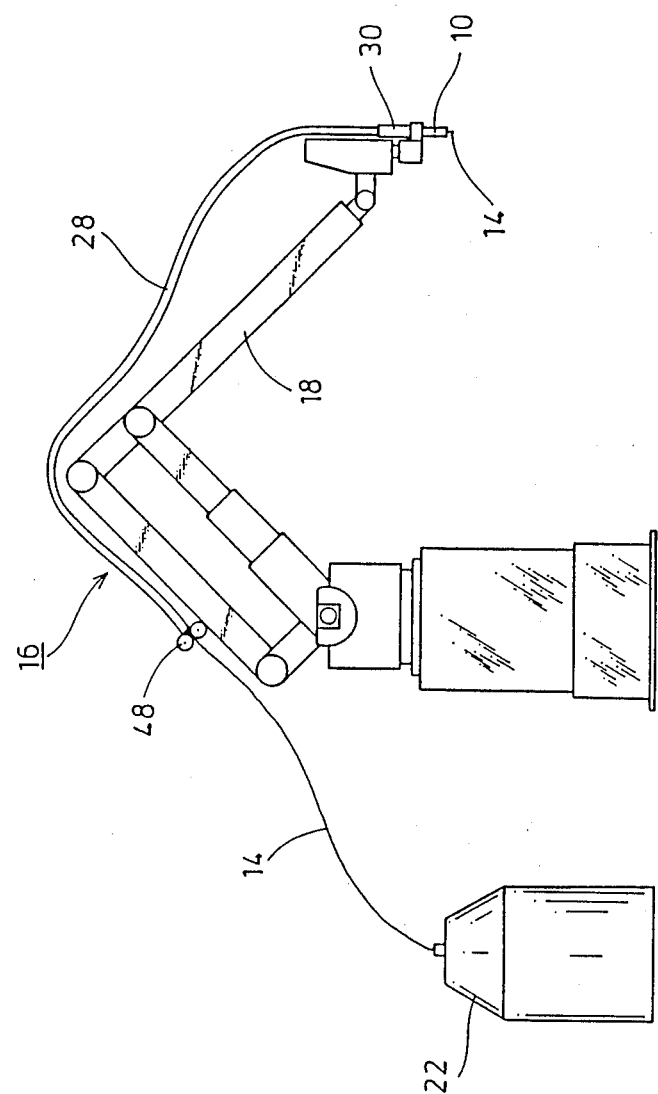
FIG. 7 is a schematic view illustrating a multi-articulated welding robot mounting the wire straightening device according to the first embodiment.

The operation of the wire straightening device thus constructed is as follows. As shown in FIG. 7, the wire straightening device 30 of the first embodiment is attached to the rear end of the welding torch 10 mounted on the arm 18 end of the multi-articulated robot. At the base portion of the arm 18, a feeding mechanism 48 is provided which feeds the welding wire 14 through the conduit 28 to the straightening device 30 and the welding torch 10. The welding wire 14 is passed through the wire insertion hole 34a of the inlet sleeve 34, pressed between the paired rollers 38 within the frame 32, and ultimately fed to the torch 10 through the wire insertion hole 36a of the outlet sleeve 36. As the welding operation of the robot proceeds, the wire 14 is consumed and therefore is fed forward that much by the feeding mechanism 48. During this process, the various motion of the torch imparts twist or like distortion to the wire 14. However, since the wire 14 passes through the wire straightening device 30 immediately before entering the torch 10, the twist or like deformation is conveniently straightened by the rollers 3.

Figure 8:
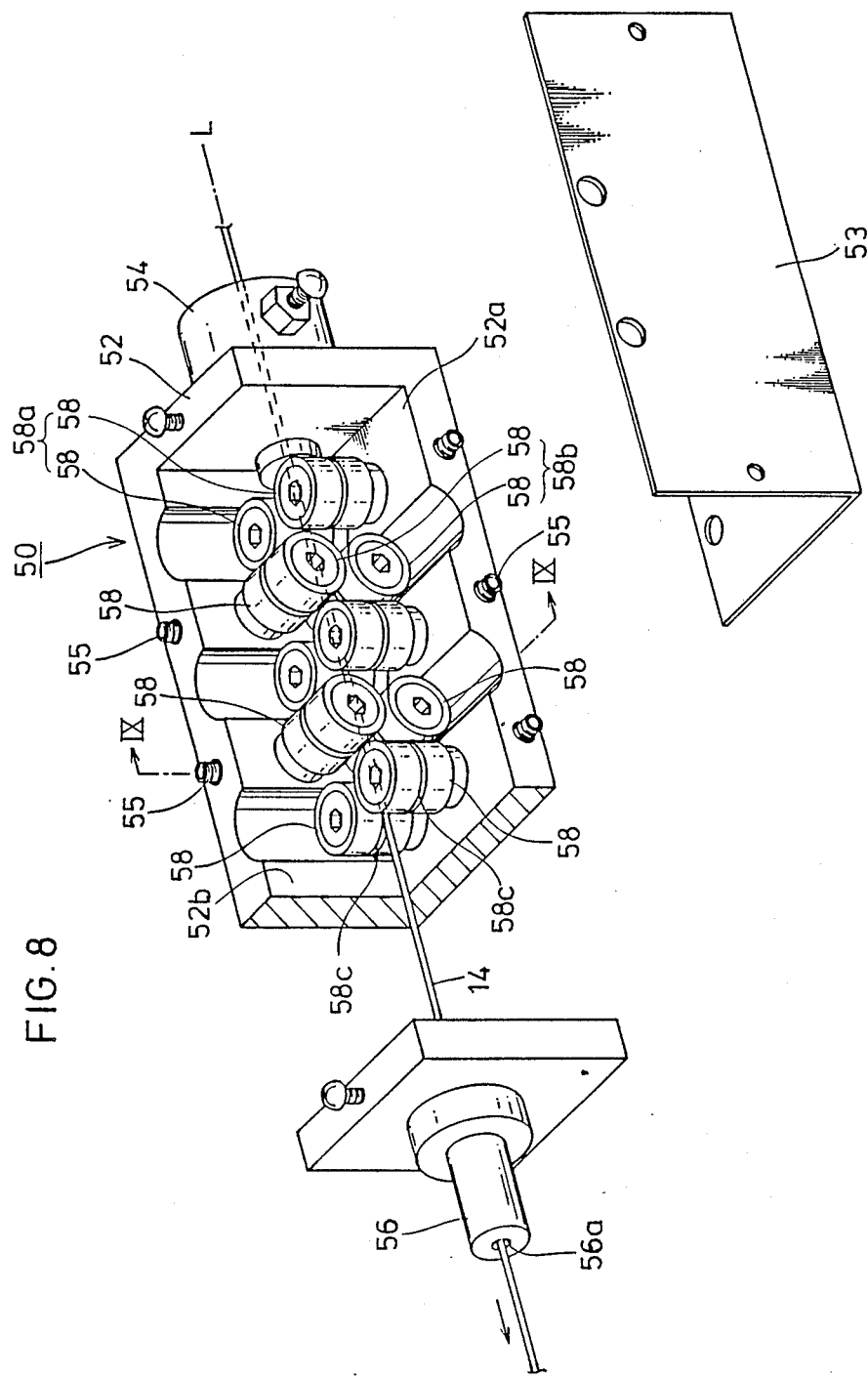
FIG. 8 is an exploded perspective view showing another embodiment of the invention.
Figure 10:
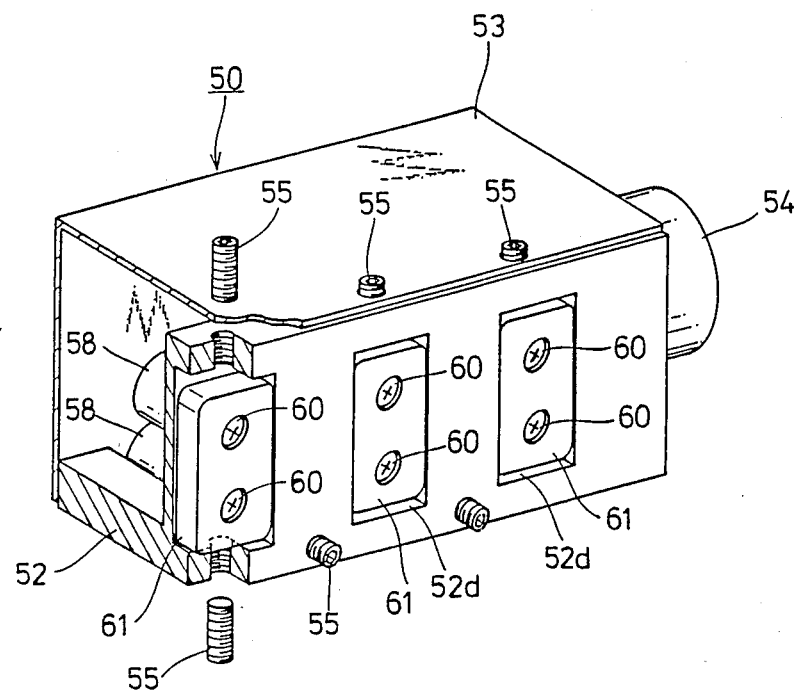
FIG. 10 is a partially cutaway view in perspective of the wire straightening device of FIG. 8 from the opposite side.

FIGS. 8 and 10 are perspective views of a wire straightening device 50 according to another embodiment of the invention. As may be seen, the device 50 includes a box-shaped frame 52 cut from a metal block member. The opening of the frame 52 may be sealably covered by a removable cover member 53 of generally L-shaped configuration. The frame 52 includes an inlet sleeve 54 and an outlet sleeve 56 connected to the longitudinal opposite ends thereof, respectively. The sleeves 54 and 56 have wire insertion holes (only one wire insertion hole 56a being shown in FIG. 8) formed in opposed relation to and axial alignment with each other.

Figure 9:
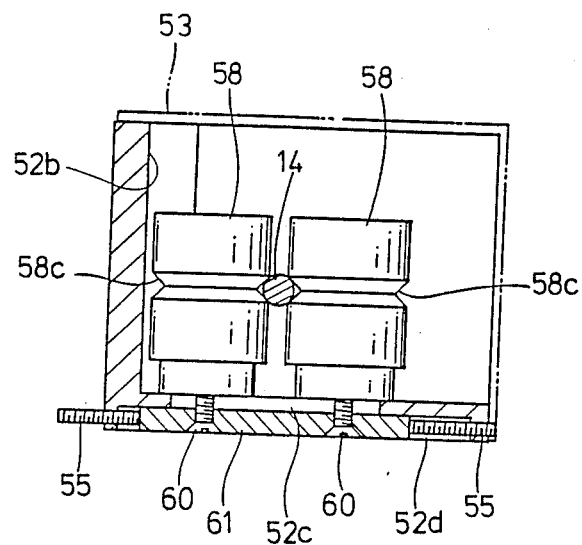
FIG. 9 is a sectional view taken substantially along line IX—IX of FIG. 8.
Figure 11:
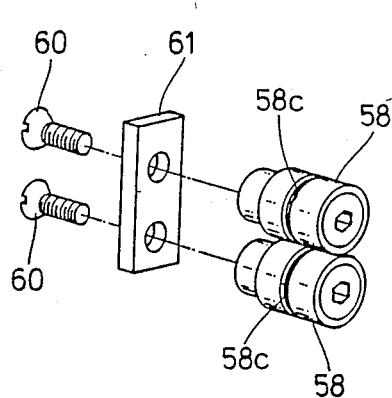
FIG. 11 is an exploded perspective view illustrating an example of the construction for mounting rollers to a support plate.

Within the box-shaped frame 52, pairs of rotatable rollers 58 for straightening a welding wire are arranged in juxtaposed relation along the feed path L of the welding wire 14. Each pair of opposed rollers 58 and the adjacent pair of opposed rollers 58 are arranged at a phase angle of 90° relative to each other. Specifically, as shown in FIG. 9, the horizontal bottom surface 52a of the frame 52 has formed therein slots 52c extending perpendicular to the wire feed path L. Two supports pins 60 carried by a support plate 61 (FIGS. 9 and 11) are inserted in each slot 52c, and the wire straightening rollers 58 are rotatably mounted on the respective support pins 60. It was experimentally ascertained that the phase angle of adjacent pairs of rollers should preferably be in the range of 60° to 90°. Within this range, other phase angle than 90° may preferably be selected.

As best shown in FIG. 10, each support plate 61 is housed within a rectangular recess 52d formed in the back of the frame 52, and is displaceably held by a pair of bolts 55 screwed in the frame 52 from opposite directions (from the top and the bottom as viewed in the drawing). In this instance, since the rectangular recess 52d communicates with the slot 52c (FIG. 9), the rollers 58 on the support pin 60 are adjustable by rotating the bolts 55 for displacement in a direction perpendicular to the wire feed path L. A total three pairs of vertical rollers 58 are provided in longitudinally spaced-apart relation along the wire feed path L.

Similarly, dual pairs of support pins 60 are provided and mounted horizontally on the vertical side wall 52b of the frame 52 adjacent the vertical roller pairs 58 disposed along the wire feed path L. Here again, each support pin 60 has each roller 58 rotatably carried thereon. In addition, the pairs of horizontally-disposed rollers 58 are also held on the support plate 61 and are adjustable for displacement in a direction perpendicular to the wire feed path L. In the present instance, another pair of opposed rollers which is mounted horizontally on the vertical side wall 52b, is provided along the wire feed path L and adjacent the vertical pair of rollers 58. Thus, the roller group includes three pairs of vertical rollers 58a and two pairs of horizontal rollers 58b.

The wire straightening rollers 58 may be small bearings commercially available, the outer races serving as rollers. The outer periphery of the roller has a peripheral V-shaped groove 58c in which the welding wire 14 may be received. Specifically, as shown in FIG. 9, the pair of wire straightening rollers 58 having opposed roller surfaces 58c, respectively, serves to passably hold the wire 14 between the opposed V-shaped grooves 58c. By means of this arrangement, the position of the wire 14 is regulated, and by means of the contact resistance, the rollers are forcedly rotated. Thus, as may be seen from FIG. 9, the distance between the paired rollers are set to a measure slightly larger than the diameter of the welding wire 14 to be straightened. In addition, the adjacent roller pairs are arranged on a substantially straight line along the wire feed path L extending between the wire insertion holes of the sleeves.

It is to be noted that the groove on the periphery of the roller may be a U-shaped groove or a semicircular groove. In addition, the grooves may be formed on the roller surface of only one roller 58 rather than both rollers in each pair of rollers 58.

Figure 1:
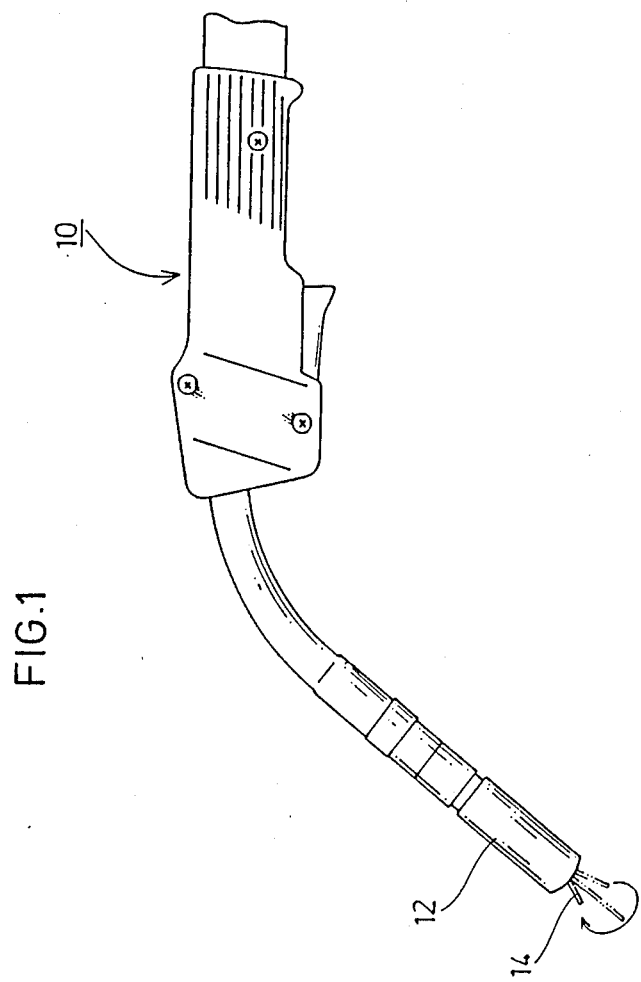
FIG. 1 is a view illustrating a tip of welding wire which swings at the nozzle open end of a welding torch.
Figure 2:
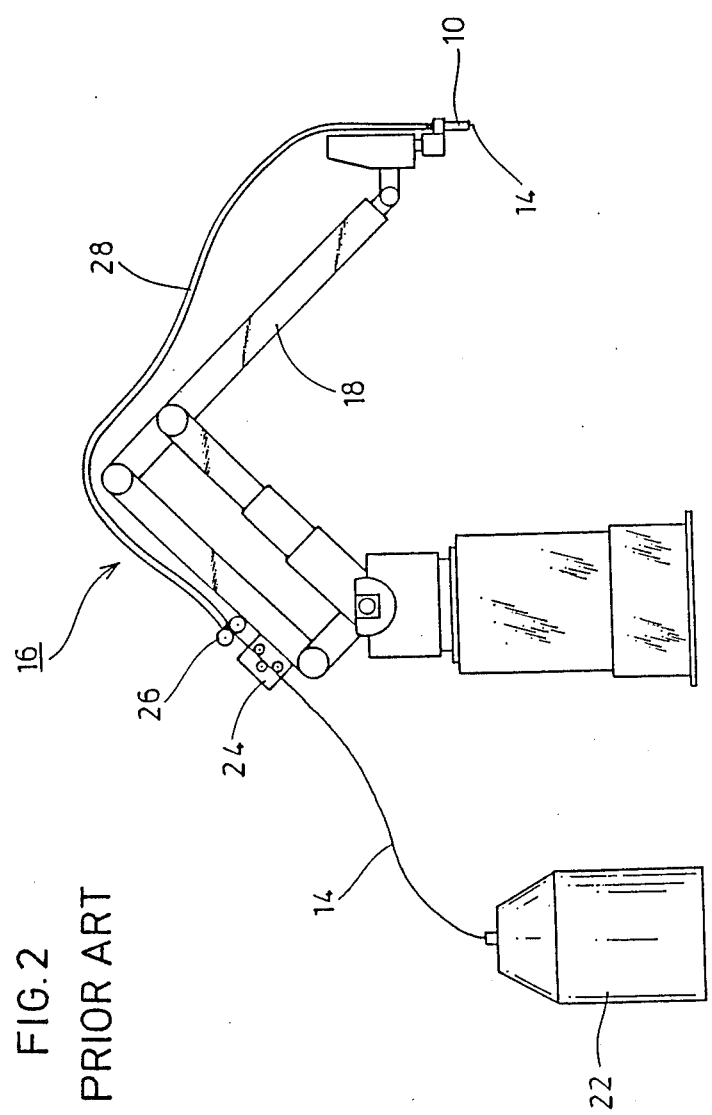
FIG. 2 is a view illustrating an example of the prior art arrangement in which a wire straightening device is mounted on an arm of a multi-articulated robot.
Figure 12:
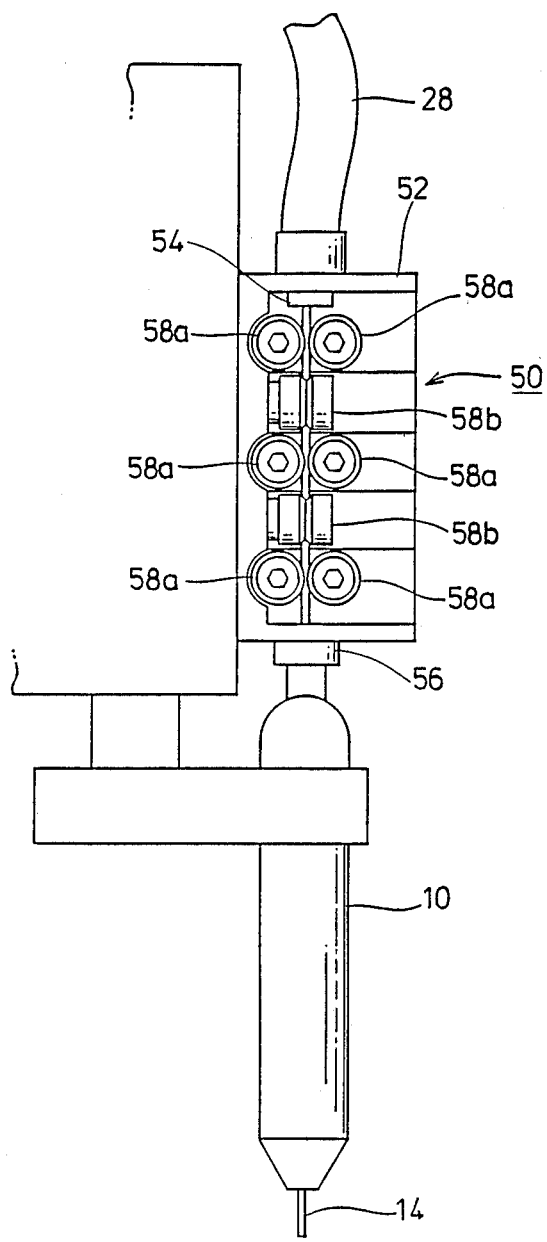
FIG. 12 is a schematic view illustrating the torch section of a welding robot mounting the wire straightening device of FIG. 8.

As mentioned above, the wire straightening device 50 according to the second embodiment of the invention is lightweight and compact in construction and hence, it can be attached to the rear end of the welding torch 10 mounted on the arm 18 end of the multi-articulated robot, as shown in FIG. 12. Also, as with FIG. 2, at the base portion of the arm 18, a feeding mechanism is provided which feeds the welding wire 14 through the conduit 28 to the straightening device 50 and the welding torch 10. The welding wire 14 is passed through the wire insertion hole of the inlet sleeve 54, pressed between the paired rollers 58 within the frame 52, and ultimately fed to the torch 10 through the wire insertion hole 56a of the outlet sleeve 56. As the welding operation of the robot proceeds, the wire 14 is consumed and therefore is fed forward that much by the feeding mechanism. During this process, twist or like deformation is conveniently straightened by the roller group, as discussed in relation to the foregoing embodiment. In addition, as mentioned above, the outer periphery of the roller has a peripheral V-shaped groove 58c for example. Since the pair of wire straightening rollers 58 serves to passably hold the wire 14 between the opposed V-shaped grooves 58c, the wire 14 passing through the grooves 58c is regulated for its position and at the same time, is forcedly rotated. Thus, the wire may be smoothly straightened by and fed through the device 50.

Figure 13:
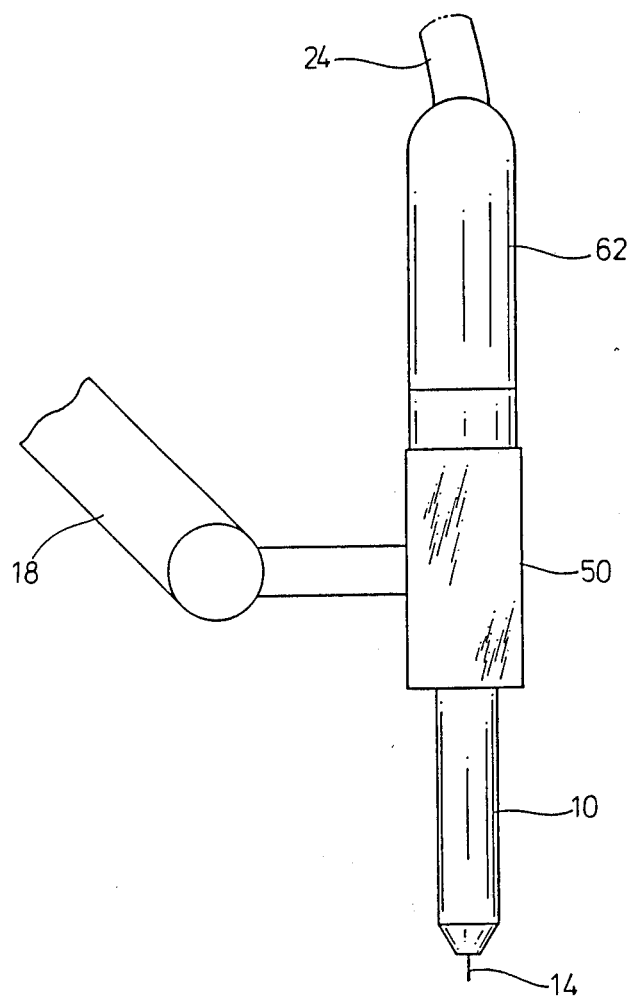
FIG. 13 is a schematic view illustrating the expanded torch section with a wire straightening device and a coupler connected to the rear end of the torch.
Figure 14:
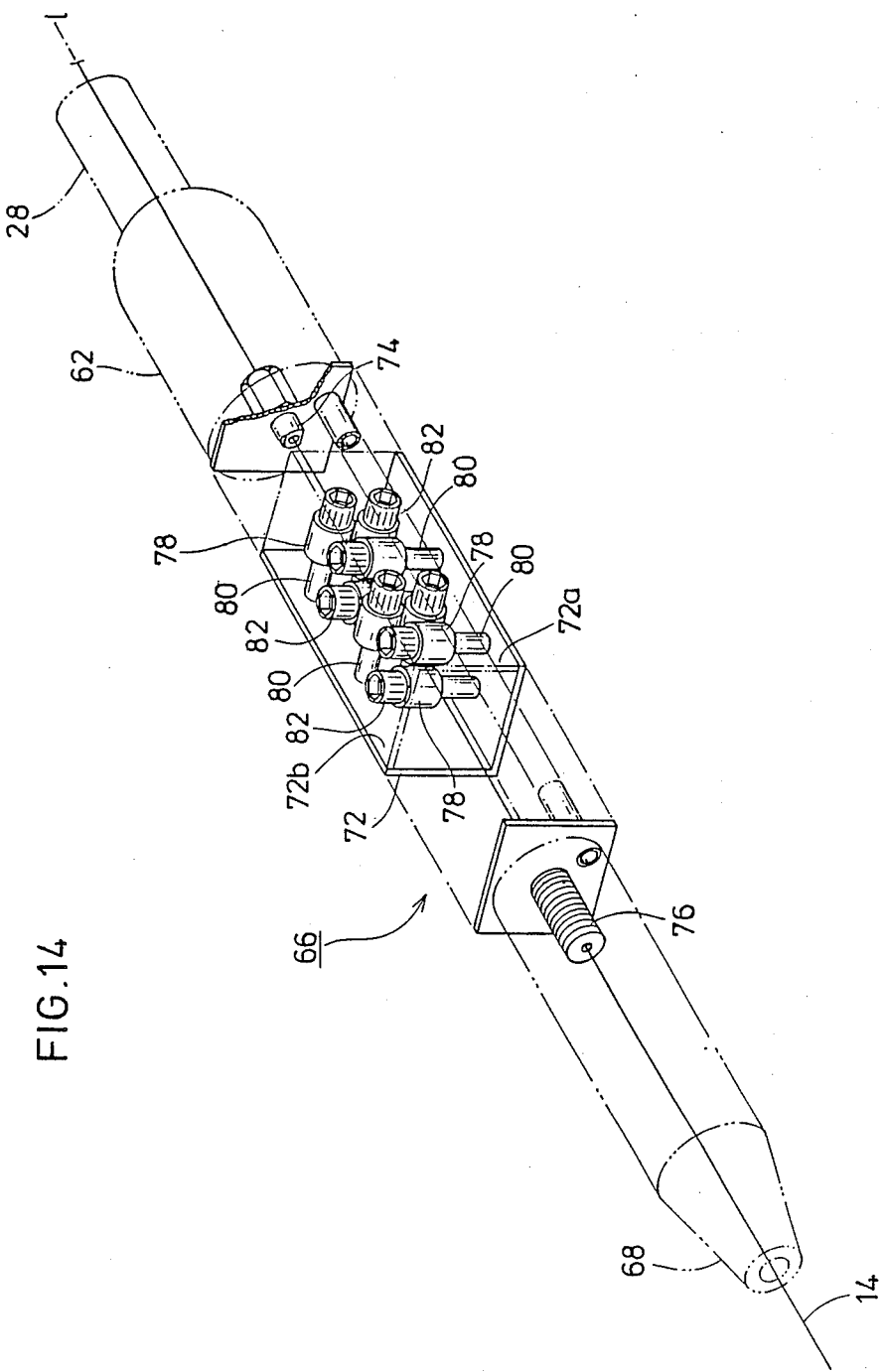
FIG. 14 is a perspective view of a welding torch according to a preferred embodiment of the invention.

FIGS. 14 to 16 show a welding torch according to a preferred embodiment of the invention. When $CO_2$ welding or like welding is carried out, shield gas such as carbon dioxide and an electric power are supplied to a welding torch while the wire is supplied through a flexible conduit. As shown in FIG. 13, the latest welding robot uses a coaxial cable in which a group of cables is integrally collected for connection to the torch 10. To connect or disconnect the coaxial cable, an instantaneous joint such as a coupler 62 is used. Since the coupler 62 handles shield gas and high potential power, the coupler 62 is required to be highly air-tight and pressure-resistant, and inevitably its construction tends to become larger. For this reason, providing the wire straightening device 50 to the top of the torch 10 and connecting the large-size coupler 62 in series with the device 50 make a generally very long system configuration, as shown in FIG. 13. In addition, since the coaxial cable 24 is a cable which collects a plurality of cables, it tends to be relatively rigid and less flexible. Thus, even though the robot itself has high capacity in its motion such as soft weaving, overall large torch and rigid coaxial cable will degrade smooth motion of the torch itself.

In view of the foregoing circumstances, the present invention has been proposed to eliminate the noted problems. The body of a welding torch 66 of the invention is basically composed of double tubular construction, the front end having a frustum-conical nozzle 68 secured thereto through an insulator 70. Disposed in the medial portion of the torch body 66 is a box-shaped frame 72 having, for example, a generally rectangular configuration in section.

The frame 72 includes an inlet sleeve 74 and an outlet sleeve 76 connected to the longitudinal opposite ends thereof, respectively. The sleeves 74 and 76 are in axial alignment with each other. Within the box-shaped frame 72, a series of rotatable rollers 78 for straightening a welding wire are arranged in juxtaposed relation and at a predetermined phase angle along a path L of wire feed. Specifically, as shown in FIG. 14, two support pins 80 are vertically mounted on the bottom surface 72a of the frame 72 and are transversely spaced at a predetermined interval in a direction perpendicular to the wire feed path L. Two pairs of the vertical support pins 80 are provided and are longitudinally spaced at a predetermined interval in a direction along the wire feed path L passing through the wire insertion holes of the sleeves 74 and 76. Each wire straightening roller 78 is rotatably carried on each support pin 80 in each pair of support pins.

The wire straightening rollers 78 may be small bearings commercially available, the outer races serving as rollers. In the embodiment illustrated, the inner race (not shown) of each small bearing is fitted at a predetermined height over the medial portion of the pin 80, and each bearing is removably fastened by a nut 82 having a top hole for a hexagon wrench. Alternatively, the rollers 78 may be bushings in place of the bearings.

Similarly, support pins 80 are provided in pairs and horizontally mounted on the vertical side wall 72b of the frame 72 adjacent the vertical roller pairs 78 disposed along the wire feed path L. Here again, each support pin 80 has each roller 78 rotatably carried thereon. In the present instance, another pair of opposed rollers 78 which is mounted horizontally on the vertical side wall 72b, is provided along the wire feed path L and with the vertical pair of rollers 78 intervening between the two pairs of horizontal rollers 78. Thus, the roller group includes two pairs of vertical rollers and two pairs of horizontal rollers.

In the embodiment of FIG. 14, the vertically-disposed roller pairs 78 and the adjacent horizontally-disposed roller pair 78 are held at a phase angle of 90° relative to each other, and the distance between the paired rollers are set to a measure substantially equal to the diameter of a welding wire to be straightened. In addition, the adjacent roller pairs are arranged on a straight line along the wire feed path L extending between the wire insertion holes of the sleeves. In other words, the roller pairs are spaced and are arranged on a straight line such that through the wire insertion hole of one sleeve, the other wire insertion hole is visible along wire feed path L. Although the embodiment of FIG. 14 utilizes cylindrical rollers as straightening rollers, it will be noted that other types of rollers could be utilized so long as their roller surfaces are positioned at a required phase angle relative to each other. For example, the rollers could be a tapered roller having a required angle of inclination. In addition, although various supply forms are available for shield gas flow path and power cable, they are well known in the art and hence, are not described herein.

The operation of the welding torch thus constructed is as follows. As shown in FIG. 16, the welding torch 66 is mounted on the forward end of the arm 18 of a multi-articulated robot. At the base portion of the arm 18, a feeding mechanism (not shown) is provided which feeds the welding wire 14 through the conduit 28 to the welding torch 66 incorporating the straightening device. The welding wire 14 is passed through the wire insertion hole of the inlet sleeve 74, pressed between the paired rollers 78 within the frame 72, and ultimately fed through the wire insertion hole of the outlet sleeve 76 to a nozzle 68 at the forward end of the torch. As the welding operation of the robot proceeds, the wire 14 is consumed and therefore is fed forward that much by the feeding mechanism. During this process, the various motion of the torch imparts twist or like distortion to the wire 14. However, as the wire 14 passes through the group of rollers mounted integrally within the welding torch 66, the twist or the like deformation is conveniently straightened.

From the foregoing detailed description, it can be appreciated that the adjacent roller surfaces arranged at a required phase angle insures reliable wire straightening operation. Also, since the wire straightening device is lightweight and compact, it can be mounted on a movable welding torch of the arm forward end of a welding robot. Thus, even when the welding torch moves in various ways, the wire may be completely straightened.

Additionally, the rollers have a groove in which the welding wire may be accommodated. By means of the grooves, the wire may be positionally regulated by passably holding the wire between the opposed grooves. Since the rollers are forcedly rotated by means of contact resistance, the wire may be straightened smoothly and reliably.

Further, since the lightweight, compact wire straightening device may be integrally arranged in a welding torch, the total length of the torch may be conveniently minimized. When the device is mounted on the arm forward end of a robot, it will not degrade the smooth motion of the torch. Therefore, the motional function of the robot will not be impaired, and high function such as, for example, soft weaving can be accomplished satisfactorily. In addition, since the wire straightening operation is performed immediately before the torch, there is no possibility of producing further twist on the wire. It will be noted that the wire straightening device integrally incorporated in the torch is not restricted to the illustrated and described embodiment so long as it is made compact, and it may be embodied in various ways than as specifically described.

What is claimed is:

1. A device for straightening a welding wire comprising:
    a frame having an inlet sleeve and an outlet sleeve on longitudinally opposite ends thereof, said inlet and outlet sleeves being coaxial to each other and said wire being fed through said inlet and outlet sleeves;
    support pins provided at predetermined points in said frame, said support pins being freely movable in connection with said direction perpendicular to a wire feed path; and
    three to five pairs of wire straightening rollers rotatably provided on said support pins and longitudinally spaced in the direction of said wire feed path, roller surfaces of each pair of said rollers being transversely spaced from each other and each of said pairs of rollers being provided at a phase angle of 60° to 90 ° from other pairs of rollers.

2. A device for straightening a welding wire according to claim 1, wherein said support pins are provided in holes which are opened at predetermined positions in said frame and in the direction perpendicular to a wire feed path such that said support pins can be fixed at any desired positions in said holes by screw means provided in said frame.

3. A device for straightening a welding wire according to claim 1, wherein said welding wire is wound and stored in a pail pack and drawn out of said pail pack spirally twisted, and said wire straightening rollers are provided in four or five pairs longitudinally spaced each other and along said wire feed path.

4. A device for straightening a welding wire according to claim 1, wherein said welding wire is wound and stored on a spool and drawn out of said spool, and said wire straightening rollers are provided in three to five pairs longitudinally spaced each other and along said wire feed path.

5. A device for straightening a welding wire according to any one of claims 1 through 4, wherein said wire straightening device is provided in a welding torch.

* * * * *

UNITED STATES PATENT AND TRADEMARK OFFICE
CERTIFICATE OF CORRECTION

PATENT NO. : 4,898,317

DATED : Feb. 6, 1990

INVENTOR(S) : Shigeo Ito, et al.

It is certified that error appears in the above-identified patent and that said Letters Patent is hereby corrected as shown below:

ON TITLE PAGE:

Column [54]: Change "WELDING WIRE STRAIGHTENING DEVICE AND WELDING TORCH" to --WELDING WIRE STRAIGHTENING DEVICE AND WELDING TORCH USING SUCH DEVICE--

Signed and Sealed this

Fifth Day of November, 1991

Attest:

HARRY F. MANBECK, JR.

*Attesting Officer*  *Commissioner of Patents and Trademarks*